United States Patent [19]

Braucht

[11] E Re. 29,190

[45] Reissued Apr. 19, 1977

[54] AUTOMATIC DREDGE PUMP REBUILDER

[75] Inventor: Theodore C. Braucht, Stanton, Calif.

[73] Assignee: Mark K Industries, San Diego, Calif.

[22] Filed: July 18, 1975

[21] Appl. No.: 597,033

Related U.S. Patent Documents

Reissue of:

[64] Patent No.: 3,769,486
Issued: Oct. 30, 1973
Appl. No.: 249,342
Filed: May 1, 1972

[52] U.S. Cl. ..... 219/76; 219/125 PL

[51] Int. Cl.[2] ..... B23K 9/04

[58] Field of Search ..... 219/76, 125, 125 PL, 219/62, 73, 137, 126, 111

[56] References Cited

UNITED STATES PATENTS

| | | | |
|---|---|---|---|
| 2,839,663 | 6/1958 | McCollom | 219/76 |
| 3,010,010 | 11/1961 | Jackson et al. | 219/76 |
| 3,428,774 | 2/1969 | Faust et al. | 219/76 |
| 3,483,353 | 12/1969 | Braucht | 219/76 X |
| 3,569,658 | 3/1971 | Moore | 219/76 |
| 3,627,973 | 12/1971 | Smith | 219/76 X |

*Primary Examiner*—Bruce A. Reynolds
*Attorney, Agent, or Firm*—Paul A. Weilein

[57] ABSTRACT

To rebuild the interior of a shell of a volute-type centrifugal dredge pump, a radial arm carrying a welding torch swings about the axis of the shell to repeatedly traverse the interior of the shell and automatically shifts the welding path at the end of each traverse. The radial arm advances or retracts radially as it rotates to follow the eccentricity of the volute configuration. The advance or retraction of the radial arm in response to its rotation is accomplished by a sprocket chain that walks around the periphery of a fixed sprocket on the axis of rotation, the diameter of the fixed sprocket being selected in accord with the eccentricity of the volute configuration.

38 Claims, 14 Drawing Figures

100
98
102
104
3
105
96
80
82
88
86
84
68
18
20
56
124
64
65
92
94
55
54
95
16
44
48
50
112
108
116
114
25
22
18
20
16
F
140
130
144
145
S-1
142
132
128
126
G
138
S-3
S-4
S-5
S-6
S-7
S-8
70
74
52
48
50
2
18
40
46
45
115
110
114
20
58
L-1
L-2
35
36
32
22
34
30
3
146
S-2
S-9
134
MS
135
136

FIG. 3.
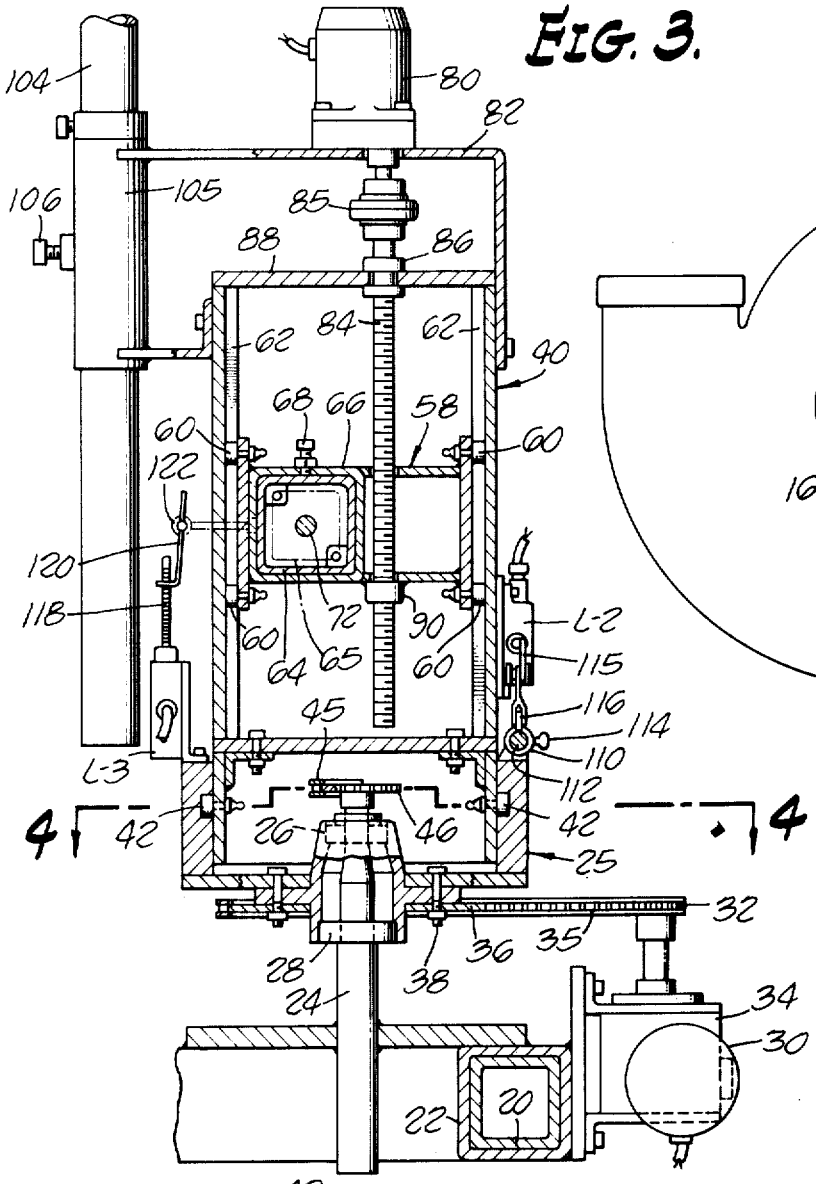
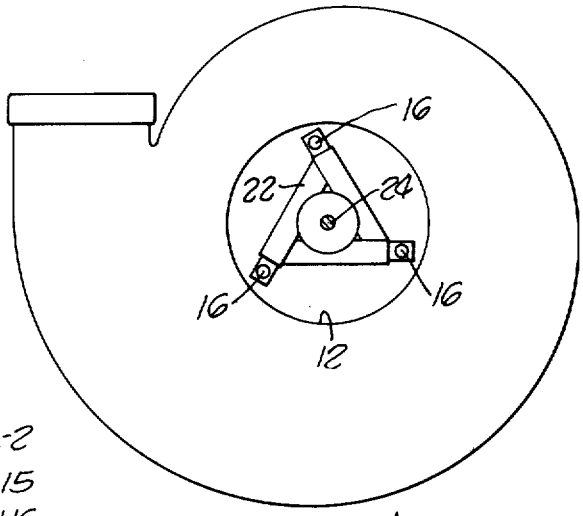
FIG. 8.
FIG. 4.
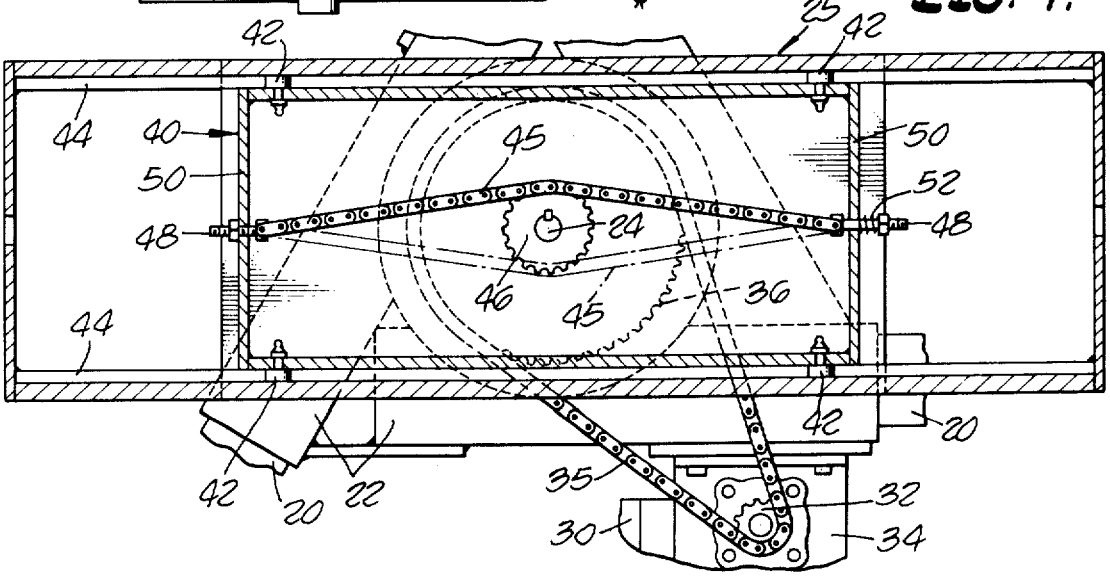

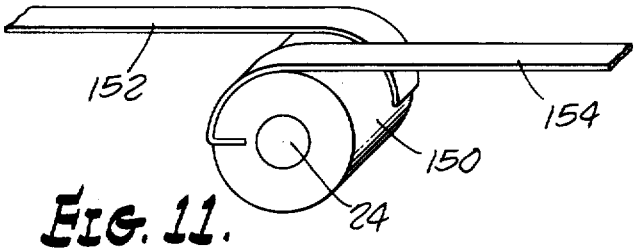
FIG. 11.
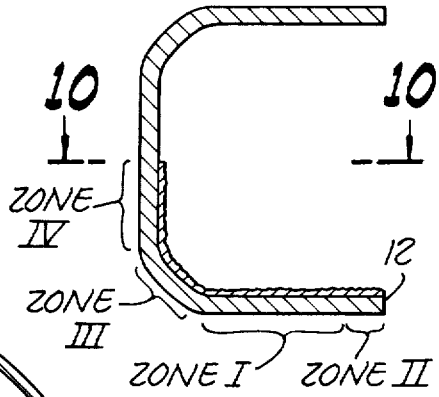
FIG. 9.
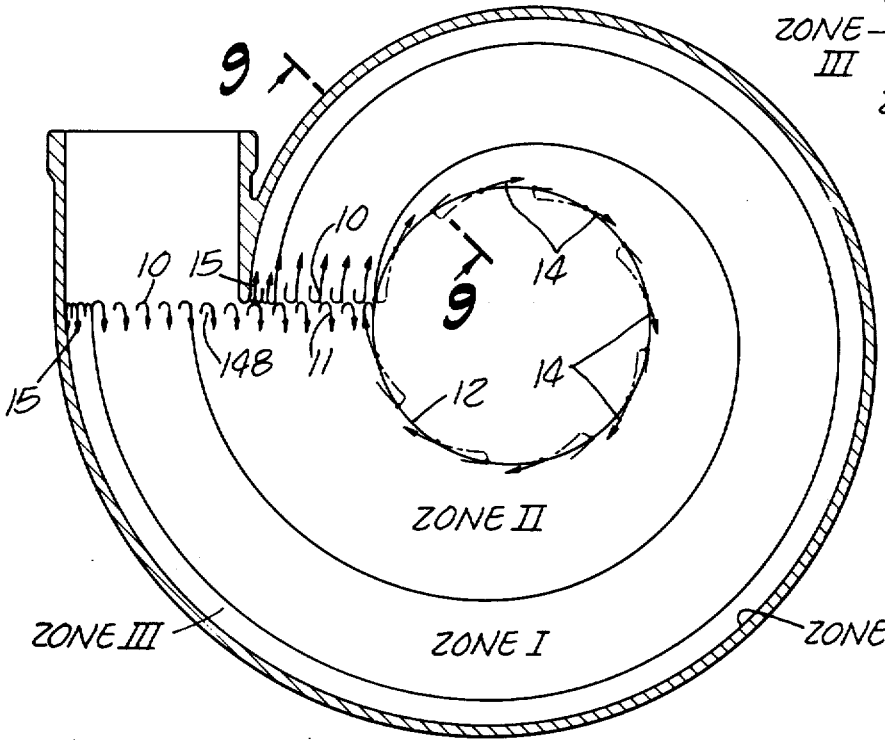
FIG. 10.
FIG. 11A.
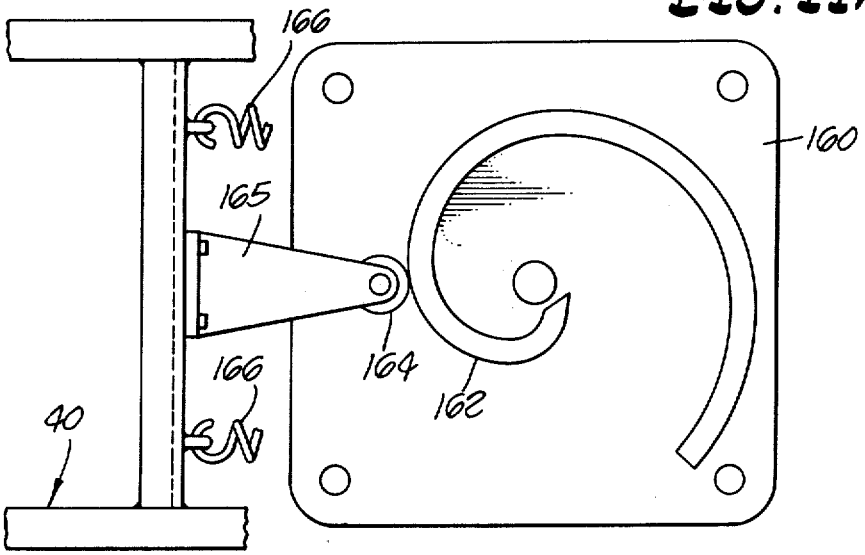

AUTOMATIC DREDGE PUMP REBUILDER

Matter enclosed in heavy brackets[ ]appears in the original patent but forms no part of this reissue specification; matter printed in italics indicates the additions made by reissue.

BACKGROUND OF THE INVENTION

This invention relates to the art of using welding techniques to rebuild the interior walls of hollow workpieces and has special utility for rebuilding the inner walls of the shells of centrifugal dredge pumps. Such pump shells have discharge ports of 14 inches diameter or larger with two opposite concentric door openings of 48 inches or larger on the axes of the shells, the shells being several feet in diameter and weighing several tons. The inner walls of the pump shells are severely abraded by the dredged material but are commonly restored by the deposition of weld metal, preferably by means of an electric welding torch. The problem has been to develop an apparatus to carry out such a welding procedure as nearly automatically as possible.

For this purpose the Braucht U.S. Pat. No. 3,254,192 discloses a boom that is mounted directly on a pump shell that is to be processed. The boom carries a torch inside the pump shell and the operator makes manual adjustments as necessary for radial extension and retraction of the traveling torch and makes vertical adjustments to step over from one inner circumferential welding traverse to the succeeding inner circumferential welding traverse. When the pump shell is turned over to prepare for welding the second half of the shell, the boom must be removed from the pump shell and must then be mounted again on the second half of the pump shell.

The Smith U.S. Pat. No. 3,627,973 discloses how a curved guide of spiral configuration may be mounted directly on a volute-type pump shell to guide a carriage inside the shell along a required eccentric or spiral path. The rotary direction of the torch travel is automatically reversed at the end of each inner circumferential traverse and step-over Jo the next succeeding inner circumferential traverse is automatic. To prepare for welding the second half of the pump shell, the curved guide must be dismantled and then mounted on the second half of the pump shell. The guide is in the form of a metal band that is bent by hand to the desired curvature and therefore does not conform accurately to the desired curvature. The band is supported at spaced points and may be flat instead of curved between the spaced support points.

In both of the above prior art disclosures the power-driven mechanism for feeding welding wire to the torch is in fixed position separate and apart from the turning structure that swings the welding torch circumferentially inside the pump shell over a range of as much as 360°. Consequently, the wire drive mechanism is remote from the torch and the flexible welding wire conduit that feeds the torch must twist to follow the wide arc of the torch. Another disadvantage is that the loop of welding wire conduit that leads to the torch hampers the operator and limits his access to the interior of the pump shell. In addition, the loop of conduit obstructs the use of a water cooling ring which is commonly used to trickle cooling water over the outside of the pump shell.

Also, in both of the prior disclosures the entire turning structure is connected to the ground side of the welding circuit. In the Smith disclosure the gearing that controls the tilt of the torch is included in the grounded structure.

In the Smith disclosure, at the end of each circumferential traverse the torch immediately steps over and reverses direction to start the next traverse. As a result weld metal at the beginning of the next traverse is deposited contiguous to liquid metal at the end of the first traverse and the two liquid deposits merge to form a single liquid body of such quantity as to tend to flow gravitationally to produce what is termed a dribble. This undesirable action occurs until the torch reaches the region of solidified metal of the first traverse.

In the rebuilding of the interior of a pump shell the operator always has to deal with local regions where the shell wall is deeply eroded to form low spots or craters. Each of the low spots must be built up before the welding torch can be employed for complete circumferential traverses of the shell interior. To build up a local low spot, the Smith apparatus is programmed to cause the torch to repeatedly reciprocate across the low spot with no loss of time at each automatic step-over and reverse in travel. Since the low spot is of limited width liquid metal is added to liquid metal on each traverse.

A further difficulty in building up a local low area may be understood when it is considered that in making a full circumferential traverse the torch travels many feet over a substantial time period so that the heat from the torch is effectively dissipated without any undue tendency to distort the pump shell. In repeatedly reciprocating the torch across a relatively narrow low area, however, the heat of the torch is concentrated in the low area with inevitable undesirable results.

In rebuilding the shell of a volute-type pump, a crescent-shaped area bordering on each circular door must be processed and the most efficient coverage would be by a pattern of spiral beads terminating at spaced points along the rim of the door opening. The Smith disclosure which provides for automatic step-over and automatic travel reversal cannot be programmed to cover the crescent-shaped area with the desired pattern of weld beads.

SUMMARY OF THE INVENTION

An important object of the present invention is to eliminate the aforementioned need for mounting some kind of rotary support structure on the pump shell that is to be processed. This object is attained by providing a power-actuated rotary support structure that may be conveniently and quickly mounted inside a pump shell on the floor on which the pump shell rests with no structural connections with the pump shell.

A further important object of the invention is to provide such an apparatus that causes the welding torch to follow accurately the spiral configuration of a volute-type pump. For this purpose, the rotary support structure includes a radial track on which a torch-bearing radial arm is mounted for rotation about the axis of the pump shell. A fixed central means is provided to cause radial movement of the torch bearing arm in response to rotation of the arm as required to follow the eccentricity of the inner circumference of the pump shell. In the preferred practice of the invention the central fixed means is a sprocket on the axis of rotation of the arm. A sprocket chain having both ends connected to the radially movable torch-bearing arm engages one side of the fixed sprocket and "walks" around the fixed sprocket as the torch-bearing arm swings about its axis, the result being radial movement of the torch-bearing arm inwardly or outwardly to follow the eccentricity of the inner circumferential wall of the pump shell. Since the diameter of the fixed pinion determines the magnitude of the radial movement of the torch-bearing arm in response to the rotation of the arm, a diameter for the fixed pinion may be selected to conform to any volute configuration.

In an alternate practice of the invention a fixed spiral cam or template is substituted for the fixed pinion and the torch-bearing arm has a follower in the form of a roller that travels along the cam or template. It is a simple matter to design such a cam or template to cause the welding torch to follow a desired eccentric path and one cam or template may be substituted for another to change the eccentricity of the path of torch travel.

As will be explained, various other novel features reside in a control system for programming the travel of the torch with automatic travel reversal and automatic step-over at the end of each inner circumferential welding traverse.

BRIEF DESCRIPTION OF THE DRAWINGS

In the accompanying drawings which are for illustrative purposes only:

FIG. 3 is a vertical transverse sectional view taken along the 3—3 of FIG. 1;

FIG. 4 is a sectional view taken along the angular line 4—4 of FIG. 3;

FIG. 8 is a diagrammatic plan view of a pump shell showing how the three-legged support structure is mounted in the two coaxial door openings of the pump shell;

FIG. 9 is a radial section of a volute-type pump shell taken along the line 9—9 of FIG. 10 showing the configuration of the inner wall of the pump shell;

FIG. 10 is a horizontal sectional view of the pump shell taken along the line 10—10 of FIG. 9;

FIG. 11 is a diagrammatic perspective view of a fixed cylinder and two straps which may be substituted for a fixed sprocket and a cooperating sprocket chain to cause radial shift of the welding torch as it traverses the inner wall of a pump shell;

FIG. 11A is a diagrammatic plan view showing how a spiral cam or template may be used to control the radial shifts of the welding torch that are required to cause the welding torch to follow the eccentric inner wall of the pump shell.

DESCRIPTION OF THE PREFERRED EMBODIMENT OF THE INVENTION

The Welding Patterns

Figure 1:
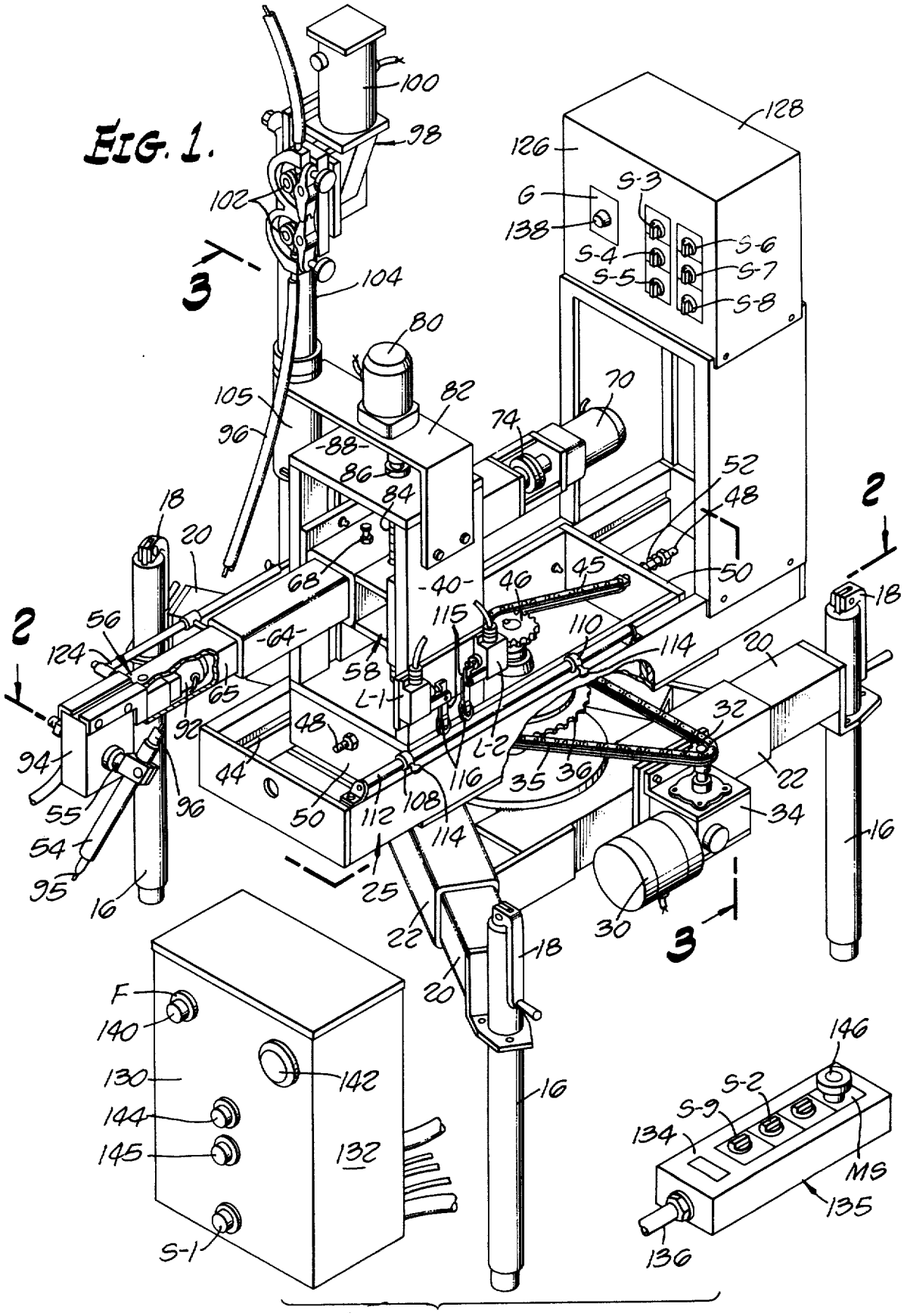
FIG. 1 is a perspective view of the presently preferred embodiment of the invention.

With a pump shell resting on a floor with its axis upright, first weld metal is deposited on the lower half of the inner wall of the pump shell and then the pump shell is reversed, i.e., turned upside down to carry out the operation of depositing weld metal on the other half of the pump shell interior. FIGS. 9 and 10 show diagrammatically how each of the two halves of the interior of the pump shell may be divided into four zones with a particular pattern of weld beads in each of the four zones.

Zone I comprises a portion of the horizontal bottom wall of the pump shell which is a spiral band of uniform width and of 360° extent. When the welding torch completes a spiral of eccentric welding bead in this zone the direction of circumferential travel of the torch is automatically reversed and at the same time the torch is shifted or stepped-over horizontally by the width of one bead to start the next succeeding inner circumferential bead of weld metal. The small curved arrows 10 at the oposite ends of this zone represent the movement of the torch in reversing direction and stepping-over at the ends of its circumferential traverses.

Zone II is a tapered spiral zone which completes the inner bottom wall of the shell. At the broad end of this zone the torch steps over and reverses as indicated by the small arrows 11. Extending from the broad end of the zone, each weld bead eventually terminates at the rim of a circular bottom door opening 12 of the pump shell, the successive weld beads terminating at successive spaced points along the circumference of the rim. At each of these spaced points the welding torch reverses direction and steps over horizontally as indicated at the series of spaced curved arrows 14.

Zone III which is of 360° extent is the transition from the inner bottom wall of the pump shell to the circumferential vertical wall of the pump shell, and as viewed in vertical section in FIG. 9 the zone has a given radius of curvature. The step-overs at the opposite ends of the zone are indicated by curved arrows 15 in FIG. 10 and are accomplished by incremental changes in the angle of the welding torch.

Zone IV is the lower half of the inner vertical wall of the pump shell, this portion of the inner wall being spiral in plan configuration. At the end of each inner circumferential weld bead the welding torch steps over by shifting vertically.

GENERAL ARRANGEMENT OF THE PARTS OF THE APPARATUS

Referring to FIG. 1 the base structure of the apparatus includes three legs 16 of telescope construction which may be extended or retracted in length by means of hinged cranks 18. Each leg is mounted on the end of a member 20 which is telescoped into a corresponding fixed member 22 to permit the legs to be adjustably spread apart as desired. As best shown in FIG. 3 the fixed base structure of the apparatus includes an upright spindle 24 on which a radial guideway 25 of box-like configuration is journalled by a pair of anti-friction bearings 26 and 28. As indicated in FIG. 8, in preparation for processing a recumbent dredge pump shell, the base structure of the apparatus is placed inside the pump shell with the legs 16 resting on the floor that supports the pump shell and with the spindle 24 accurately positioned on the axis of the pump shell, i.e., on the common axis of the two circular door openings 12 of the pump shell. To rotate the radial guideway 25 about the axis of the spindle 24, a first power means in the form of a reversible motor 30 drives a sprocket 32 through a gear box 34 and an endless chain 35 extends from the small sprocket to a larger sprocket 36 which, as shown in FIG. 3, is fixedly mounted on the underside of the guideway 25 by means of bolts 38.

An upright box-like main carriage, generally designated 40, is adapted to move along the guideway 25 radially of the fixed spindle 24 and for this purpose, as shown in FIGS. 3 and 4, the carriage is mounted on two pairs of rollers 42 that track in longitudinal grooves 44 on the opposite inner walls of the guideway. When the motor 30, which may be termed the turn motor, turns the guideway 25 about the axis of the fixed spindle 24, suitable means causes the carriage 40 to move radially in the guideway in response to the turning movement of the guideway. In the preferred practice of the invention the radial movements of the carriage 40 are controlled by a short length of sprocket chain 45 which engages one side of a fixed sprocket 46 that is mounted inside the guideway on the upper end of the fixed spindle 24. The opposite ends of the sprocket chain 45 are connected by bolts 48 to the opposite end walls 50 of the carriage 40 with a coil spring 52 on one bolt yieldingly maintaining the sprocket chain 45 in tension.

To cause the torch to travel in a circular path as distinguished from an eccentric path, it is necessary merely to disengage the sprocket chain from the fixed sprocket.

Figures 2, 5, 6, 7:
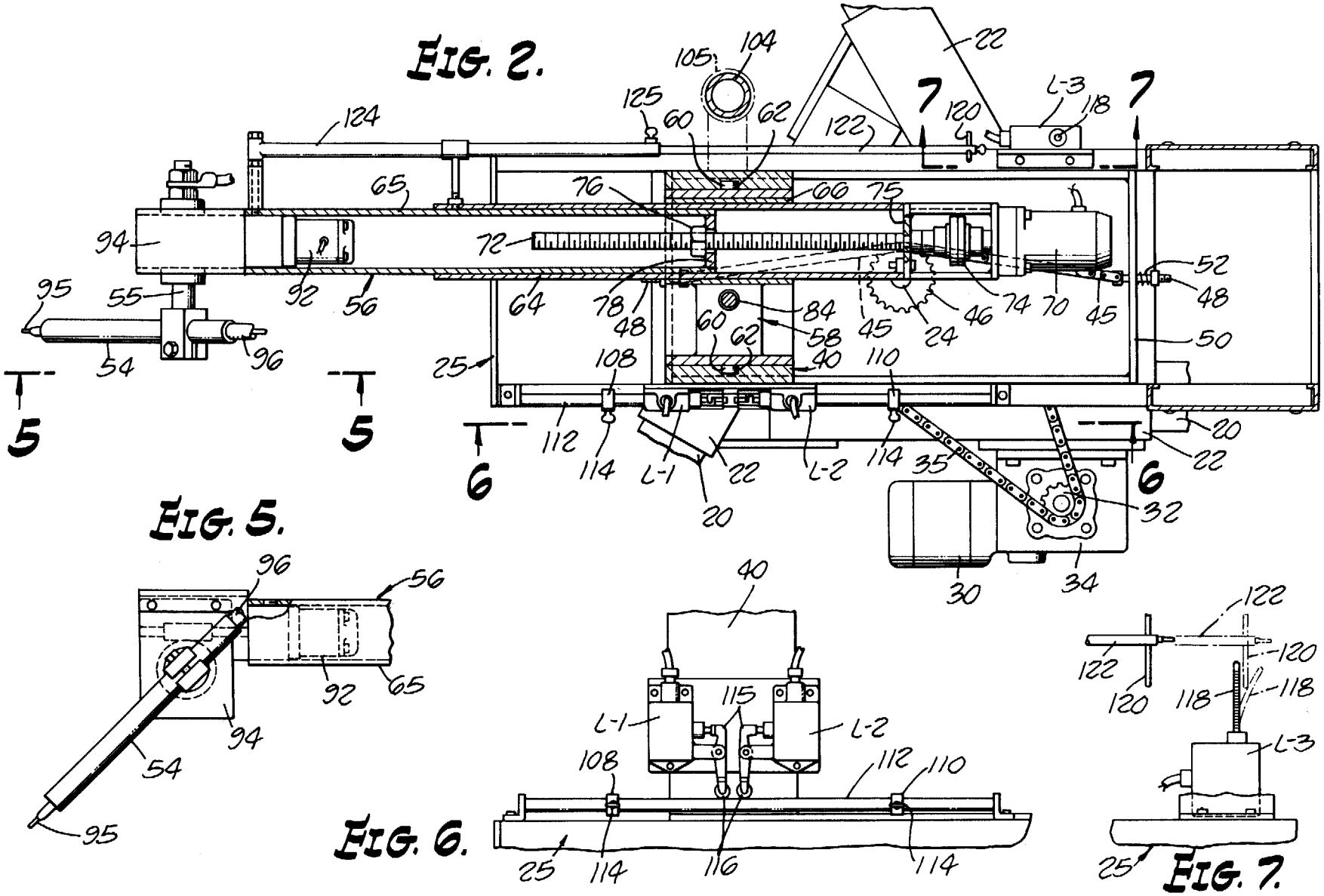
FIG. 2 is a horizontal sectional view taken along the line 2—2 of FIG. 1.
FIG. 5 is a fragmentary side elevational view of the welding torch and associated structure as seen along the line 5—5 of FIG. 2.
FIG. 6 is a fragmentary side elevation as seen along the line 6—6 of FIG. 2.
FIG. 7 is a elevational view of a limit switch and associated structure as seen along the line 7—7 of coaxial 2.

A welding torch 54 shown in FIGS. 1, 2, and 5 is mounted on the upright carriage 40 in a suitable manner that permits three kinds of independent movement of the welding torch, namely, radial movement inwardly and outwardly relative to the upright spindle 24, up and down vertical linear movement, and vertical angular movement. In the construction shown, the required mobility of the welding torch 54 is provided by pivotally mounting the welding torch by means of shaft 55 on the outer end of an arm, generally designated 56, that is positioned on the upright carriage 40 generally radially of the turning axis at the spindle 24 with provision for extending and retracting the arm and provision for independently raising and lowering the arm relative to the carriage. The welding torch 54 is releasably clamped on the shaft 55 to permit adjustment of the radial distance of the tip of the torch from the shaft so that the arc described by the tip may conform to the radius of curvature of an interior wall of the pump shell. The arm 56 is mounted on an auxilliary carriage, generally designated 58, that is movable up and down on the main carriage 40 and for this purpose, as shown in FIGS. 2 and 3, the auxiliary carriage is mounted on two pairs of rollers 60 that track in a pair of vertical grooves 62 on the opposite inner walls of the main carriage 40.

The approximately radial arm 56 is made in two telescoping tubular sections of square cross sectional configuration comprising an inner base section 64 that is normally fixed and an outer end section 65 that is slidable in the base section. The structure of the auxiliary carriage 58 includes a sleeve 66 of rectangular cross section in which the base section 64 of the arm 56 is adjustably retained by a set screw 68. The arm 56 is extended and retracted by a second power means in the form of a reversible motor 70 that is mounted on the base section 64 and drives a worm shaft 72 through a torque limiter 74. The worm shaft is journalled in a transverse wall 75 of the base section 64 and is in screw-threaded engagement with a traveling nut 76 that is welded onto a transverse wall 78 of the end section 65 of the arm. Thus, energization of the second power means 70 extends and retracts the torch-bearing radial arm 56.

What may be termed a third power means comprising a reversible motor 80 mounted on the upper end of the main carriage 40 by means of a bracket 82 serves to raise and lower the auxiliary carriage 58 for the purpose of shifting the welding torch 54 vertically. For this purpose the motor 80 drives a worm shaft 84 through a torque limiter 85. The worm shaft 84 is journalled by a bearing 86 in an upper wall 88 of the main carriage 40 and screw-threadedly engages a traveling nut 90 that is welded to the auxiliary carriage 58.

What may be termed a fourth power means comprising a reversible motor 92 is mounted inside the outer end section 65 of the arm 56 to control the angle of the welding torch 54. The motor 92 actuates gearing in a gear box 94 to rotate the shaft 55 on which the welding torch is mounted. The welding circuit is grounded independently of the rotary support structure and the gear box 94 and the gearing therein are made of nonconductive material.

Welding wire 95 is supplied to the welding torch 54 from a supply source (not shown), the welding wire being fed through a flexible tube 96 by means of a conventional wire feed mechanism that is generally designated by numeral 98 in FIG. 1. The wire feed mechanism includes a motor 100 which actuates the welding wire by means of a pair of drive rollers 102. The wire feed mechanism 98 is on the upper end of a post 104 that extends upward from the main carriage 40. As shown in FIG. 3, the post 104 is adjustably mounted in an upright sleeve 105 and is releasably secured therein by a suitable set screw 106. Since the wire feed mechanism is mounted on the main carriage 40 and travels therewith, the feed tube 97 is in constant alignment with the torch and does not twist to follow the torch.

Two spaced limit switches L-1 and L-2 on the main carriage 40 are actuated by corresponding collars 108 and 110 that are mounted on a longitudinal rod 112 of the guideway 25 and are adjustably secured thereon by means of suitable thumb screws 114. Each of the limit switches L-1 and L-2 comprises a microswitch and an operating lever 115, the operating lever carrying a roller 116 that tracks on the longitudinal rod 112.

The two limit switches L-1 and L-2 cooperate in the depositing of weld metal in Zones I, II, and IV, the limit switches responding to the reciprocation of the main carriage 40 relative to the guideway 25 and thereby responding to the circumferential travel of the welding torch. In applying weld metal in zone II, however, a third limit switch L-3 on the opposite side of the main carriage is employed instead of the limit switch L-2. To make the substitution the thumb screw 114 of the collar 110 with which limit switch L-2 cooperates is loosened and the collar is moved out of the way to the end of the rod 112.

The third limit switch L-3 has a resiliently flexible operating arm 118 that is operated by an actuator 120 on the end of a longitudinal rod 122 that is carried by the guideway 25. In the construction shown the longitudinal rod 122 is adjustably slidable in a fixed longitudinal tube 124 and is releasably secured therein by a thumb screw 125.

Control Panels

The apparatus has three control panels comprising: a control panel 126 on the face of an elevated cabinet 128 that is mounted on the guideway 25; a control panel 130 on a cabinet 132 that rests on the floor in the region of the pump shell that is being processed; and a control panel 134 on a small remote-control unit 135 on the end of a flexible cable 136.

The small remote control unit 135 may be used to set up the apparatus to initiate the deposition of weld metal in any one of the previously mentioned four zones and for this purpose may be placed anywhere on or in the pump shell for the convenience of the operator. When the apparatus is in the process of depositing weld metal in one of the four zones, the remote control unit may be spaced several feet away from the pump shell within reach of the operator as he observes the welding operation.

The panel 126 of the elevated cabinet 128 has the following control components: a timer G having an adjustment knob 138 to determine the magnitude of the step-over movement of the welding torch 54 at each end of its eccentric traverse of the interior of the pump shell; three two-position manual control switches S-3, S-4, and S-5; and three corresponding manually operable three-position selector switches S-6, S-7. and S-8. Switch S-3 is moved to one position when it is desired that the motor 80 be energized automatically for stepover at the end of each circumferential traverse by the torch 54 and is placed in an alternate position when it is desired to inch the arm 56 upward or downward for positioning the torch to start operation in one of the four zones. The corresponding switch S-6 is turned from neutral position in one direction to operate motor 80 for raising the arm 56 and is turned in the opposite direction to lower the arm.

Switch S-4 is placed in one position when automatic energization of the motor 92 is desired to tilt the torch 54 for step-over at the ends of welding traverses of the torch 54 and is movable to an alternate position when it is desired to energize the motor 92 for inching the torch along its arcuate path. The corresponding switch S-7 is turned from neutral in one direction to energize the motor 92 for swinging the torch 54 downward and is movable to an opposite position for causing the torch 54 to swing upward.

Switch S-5 is placed in one position for automatic energization of the motor 70 to move the torch 54 horizontally for step-over at each end of its welding traverse and is movable to its alternate position when it is desired to energize the motor 70 for inching the welding torch horizontally into position for starting a welding operation in one of the four zones. The corresponding switch S-8 is movable from neutral in one direction to energize the motor 70 for moving the welding torch horizontally outwardly and is movable in the opposite direction to cause the welding torch to move horizontally inwardly.

The control panel 130 of the cabinet 132 has a timer F with an adjustment knob 140 to determine the duration of the pause of the torch 54 at each end of its circumferential traverse. A clock timer 142 on the panel 130 indicates the cumulative time of the welding operation and an adjustable knob 144 determines the speed of the wire-feed motor 100. An adjustable knob 145 determines the speed of the operation of the motor 30 that turns the guideway 25 to swing the welding torch 54 along its eccentric path. S-2 on the panel 134 in a selector switch which is movable in one direction against spring pressure from a neutral position to one limit position for starting the motor 30 in one direction to initiate welding in one of the four zones and is movable against spring pressure to an opposite limit position for starting motor 30 in the opposite direction. Once the motor 30 is started in the desired direction switch S-2 is released and automatic operation of the apparatus takes over.

The small remote control unit 135 has a master switch MS of the "panic" type, a lighted knob 146 being pulled out to energize the control system and being pushed in to de-energize instantly all of the various motors as well as the welding current. A switch S-1 on panel 130 of cabinet 132 is moved to one limit position when it is desired that the turn motor 30 be energized automatically in the automatic welding cycle and is turned to an opposite limit position when it is desired to employ the previously mentioned selector switch S-2 for momentarily energizing the turn motor in either direction for inching the welding torch into a starting position.

Switch S-9 on the remote control unit 135 is in parallel with the previously mentioned switch S-8 on the control panel 126 and may be used alternately with switch S-8 to control the motor 70 for inching the welding torch horizontally in either direction. Whenever it is desirable in the course of setting up the apparatus, the operator may plug the remote control unit 135 into a circuait on the apparatus to substitute switch S-9 for switch S-6 for inching the motor 80 or may plug into a circuit on the apparatus to substitute switch S-9 for the motor 92.

Operation of the Apparatus

To inch the torch 54 into position for starting a welding operation in any one of the four zones, the master switch MS is turned on and the switches, S-1, S-3, A-4, and S-5 are adjusted for manual control of the four motors 30, 70, 80, and 92, respectively. Switch S-2 is turned in one direction or the other to inch the motor 30 in one direction or the other; switch S-6 is turned in one direction or the other to inch motor 80 in one direction or the other; switch S-7 is turned in one direction or the other to inch the motor 92 in one direction or the other, and either switch S-8 or the alternate switch S-9 is turned in one direction or the other to inch the motor 70 in one direction or the other.

With the torch inched to the desired starting position for deposition of weld metal in zone I, switch S-1 and switch S-5 are adjusted for automatic operation, switches S-3 and S-4 being in their neutral positions. Switch S-2 is then momentarily turned against spring pressure from its neutral position to one of its two limit positions in accord with the desired initial direction the motor is to swing the torch for carrying out the first welding traverse in the zone. The adjustment of switch S-5 to its automatic position causes the motor 70 to be energized for horizontal step-over of the torch at each end of the welding traverse of the torch. Timer F is adjusted to cause the motor 30 to be de-energized to pause for a predetermined time period at the end of each welding traverse by the torch. Timer G is adjusted for a shorter time period for energization of motor 70 for step-over while motor 30 is de-energized at the end of a welding traverse. The shorter timer period set by the timer G is sufficient to cause motor 70 to be energized just long enough to step over the welding torch for starting the next successive welding bead. For example, the timer G may be set for two seconds. Thus, the welding torch pauses at the end of each of its welding traverses and during the pause steps over horizontally to start the next welding bead.

Before the welding operation is started in zone I the two stop collars 108 and 110 are adjusted on the longitudinal rod 112 to operate the two limit switches L-1 and L-2 at the opposite ends of zone I. When the motor 30 is swinging the guideway 25 to the right or clockwise in FIG. 1, the fixed pinion 46 and the cooperating chain 45 cause the main carriage 40 to move radially outwardly along the guideway 25. Thus, limit switch L-1 causes the motor 30 to stop and reverse at the outer end of zone I and switch L-2 stops and reverses the motor at the inner end of zone I.

To carry out the welding operation in zone II the starting point of the torch may be at the point of maximum radial distance in zone II which point is designated by numeral 148 in FIG. 10. The stop collar 108 for the limit switch L-1 is adjusted in accord with the starting point 148 to cause step-over and reversal of the direction of the travel of the torch.

Limit switch L-3 is now substituted for limit switch L-2 and for this purpose stop collar 110 is shifted to the corresonding end of rod 112 to avoid operating limit switch L-2. The stop of actuator 118 for the third limit switch L-3 is now adjusted in position in accord with the radius of the door opening 12 to cause switch L-3 to operate when the welding torch reaches the rim of the door opening. It is to be noted that because of the eccentricity of the weld beads in zone II, the weld beads terminate at relatively widely spaced points along the rim of the door opening 12.

Switches S-1, S-5 are adjusted for automatic operation and switch S-2 is now momentarily turned in one direction or the other against spring pressure to initiate rotation of the turn motor 30 in the direction to swing the torch counterclockwise as viewed in FIG. 10. When the torch reaches the rim of the door opening 12, the resiliently flexible operating member 118 of limit switch L-3 encounters the stop or actuator 120 to cause the welding current and the feed of the wire to be interrupted to permit step-over to the next welding bead. During this pause motor 70 is energized for the time period determined by the timer G to cause the torch to step-over radially inwardly. The operating arm 118 of limit switch L-3 is flexible to yield to the step-over. When motor 30 is again energized to start swinging movement of the torch-bearing arm, the flexible operating arm of limit switch S-3 stays under stress to delay starting welding until the torch again reaches the rim of the door opening 12.

To deposit weld metal in zone III the torch is inched to a starting point at one of the two ends of the zone and the stop collars 108 and 110 for the limit switches L-1 and L-2 are adjusted for actuation of the limit switches at the two ends of the zone. Switches S-1 and S-4 are adjusted for automatic operation and switch S-2 is momentarily operated in one direction or the other to start the turn motor 70 in a direction to cause the torch to traverse zone III. When the torch reaches an end of zone III energization of the welding circuit and the feed wire mechanism is interrupted and energization of the turn motor 30 is interrupted for the time period set by timer F to permit step-over and reversal of the turn motor. During this time interval timer G energizes motor 92 to cause change in angle of the torch as required for step-over to the next welding bead.

To carry out the deposition of weld metal in zone IV the torch is inched to a starting position at one end of the zone and switches S-1 and S-3 are set for automatic operation. When the torch reaches the end of a traverse and motor 30 is consequently de-energized for a time period determined by the adjustment of the timer F, motor 80 is energized through switch S-3 for a time interval determined by the timer G to cause the torch to be shifted up for step-over to the next welding bead.

When the deposition of weld metal has been completed in zones I, II, III, and IV to rebuild one-half of the inner wall of the pump shell, the pump shell is turned over and the sprocket chain 45 is shifted to the opposite side of the fixed pinion 46 to cause outward radial shift of the main carriage 40 instead of radially inward shift in response to counterclockwise rotation of the guideway 25 by the turn motor 30 and the procedures for depositing weld metal in zones I, II, III, and IV of the second half of the pump shell are repeated.

In processing each of the four zones I, II, III and IV by welding torch traverses of maximum circumferential extent permitted by the zone, timer F may be set for a three second pause during which pause timer G operates for two seconds to carry out the step-over. An important feature of the invention, however, is that timer F can be set to prolong the pause to any extent desired. Thus, the pause may be prolonged to permit the weld metal at the end of one bead to solidify before the next bead is started.

The most important advantage of being able to prolong the pause is when the torch is programmed to reciprocate across a low area that is relatively narrow. If the torch is programmed to pause, say for 15 seconds, at the end of each traverse, not only is the deposition of liquid metal on liquid metal avoided, but also overheating of the narrow zone is avoided.

THE MODIFICATIONS OF THE APPARATUS ILLUSTRATED BY FIGS. 11 AND 11A

FIG. 11 shows how a fixed drum or cylinder 150 may be substituted for the sprocket 46, the cylinder being stationary on the axis of the fixed spindle 24. Two straps 152 and 154 are partially wrapped around the cylinder in opposite directions and are anchored thereto at their inner ends. The two straps extend tangentially from the periphery of the cylinder in opposite directions and are connected respectively to the carriage. It is apparent that the cylinder and the two straps are functionally equivalent to the previously described fixed sprocket 46 and sprocket chain 45.

FIG. 11A shows how a fixed cam or template 160 may be substituted for the sprocket chain 45 and the cooperating fixed sprocket 46. The template 160 provides a spiral cam surface 162 which preferably is of more than 360° extent. A follower in the form of a roller 164 is mounted on the main carriage 40 by means of a bracket 165 and a pair of coil springs 166 acting in tension of the carriage continuously urge the roller 164 against the spiral cam surface 162. The spiral configuration of the cam surface 162 is selected to cause the radially outward and radially inward movement of the carriage 40 that is required for the welding torch to follow the eccentric interior of the pump shell. It is apparent that one template 160 may be substituted for another for a changeover from a pump shell of one volute configuration to a pump shell of a different volute configuration.

Control System

Figure 12A:
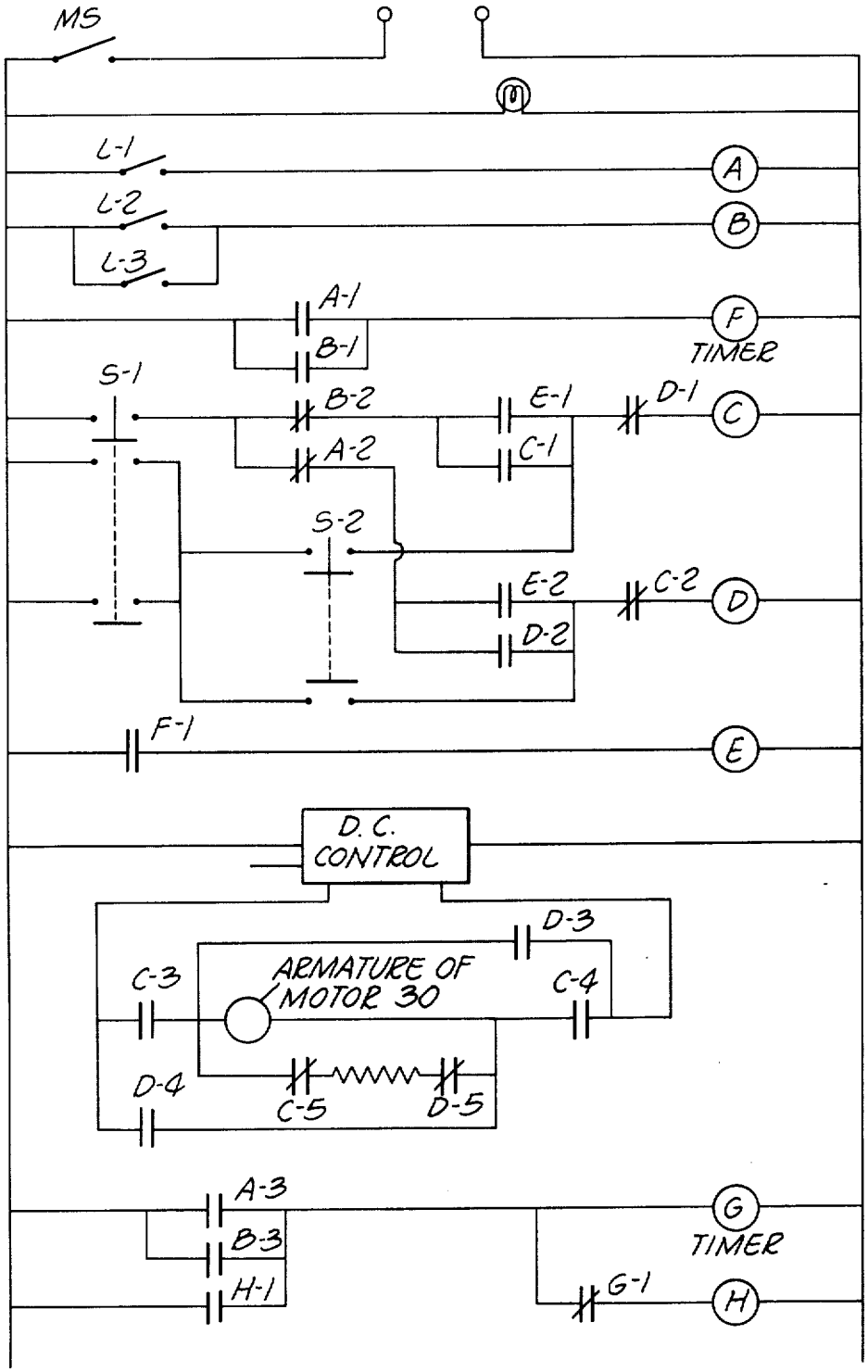
FIGS. 12A and 12B together constitute a wiring diagram of the presently preferred control system for the apparatus.
Figure 12B:
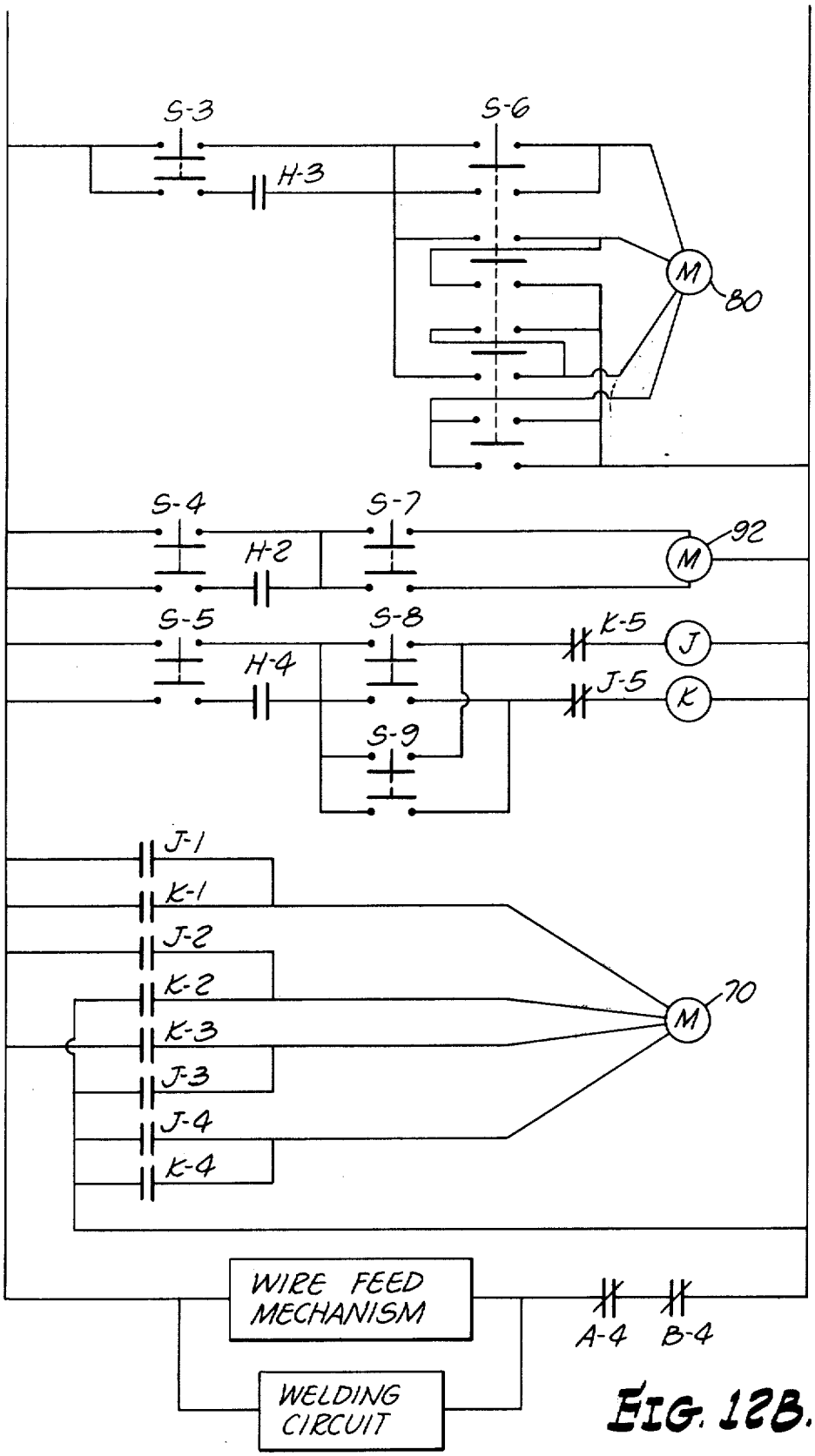

The described functions of the apparatus may be carried out by a control system of the character indicated by FIGS. 12A and 12B. Circles in the wiring diagram designated A, B, C, D, E, H, J, and K, represent relay coils which when energized open or close one or more sets of relay contacts. The corresponding sets of relay contacts are designated A-1, A-2, B-1, B-2, etc. The relay contacts are shown by pairs of short parallel vertical lines when normally open and by such pairs of lines crossed by a diagonal line when the contacts are normally closed. Circles designated F and G represent the coils of the timers F and G respectively and the corresponding sets of relay contacts are designated F-1 and G-1, etc. Details of the welding circuit and the circuit of the wire-drive motor 100 are omitted but the wiring diagram does show normally closed relay contacts A-4 and B-4 in series with both the wire feed mechanism and the welding circuit to de-energize both during each pause of the welding torch.

In the wiring diagram: master switch MS is open; limit switches L-1, L-2, and L-3 are open; switches S-1, S-2, S-3, S-4, S-5, S-6, S-7, S-8, and S-9 are shown in their neutral positions.

Assume that with master switch MS closed the apparatus is in the process of depositing weld metal in zone I and the carriage 40 is traveling towards the stop collar for limit switch L-2, both limit switches L-1 and L-2 being in their normal open positions. Switch S-1 has been placed in automatic mode and switch S-2 has been briefly manually operated against spring pressure to one of its two limit positions to energize relay coil C and thereby establish a holding circuit through contacts C-1 to keep the relay coil energized after switch S-2 is returned to its neutral open position. Energization of relay coil C opens normally closed contacts C-2 to de-energize relay coil D and closes normally open relay contacts C-3 and C-4 to energize motor 30 in one direction.

If switch S-2 had been momentarily turned to its alternate position to initiate counterclockwise rotation of the guideway and travel of the carriage 40 towards the collar for limit switch L-1, the holding circuit would be set up through relay coil D instead of relay coil C, normally closed contacts D-1 being open in the circuit of relay coil C and normally open relay contacts D-3 and D-4 being closed for determining the direction of energization of the motor 30.

For the purpose of carrying out the welding operation in zone I, switches S-3, S-4, S-6, and S-7 are in their neutral open position. Switch S-5 is in its automatic mode because motor 70 is to be used for horizontal step-over at the end of each welding traverse. With switch S-5 in automatic mode switch S-8 is in one of its two limit positions to determine the direction of step-over at the end of each traverse and in this instance is in the position to energize relay coil J through normally closed relay contacts K-5. If the horizontal step-over were to be in the opposite direction switch S-8 would be positioned to energize relay coil K through normally closed relay contacts J-1.

When the main carriage 40 moves far enough it closes limit switch L-2 to energize relay coil B with consequent closing of normally open relay contacts B-1, opening of normally closed relay contacts B-2, and closing of normally open relay contacts B-3. The closing of relay contacts B-1 energizes timer F; the opening of relay contacts B-2 de-energizes relay coil C; and the closing of relay contacts B-3 energizes timer G. Thus, both timers F and G are started at the same instant.

The de-energization of relay coil C opens relay contacts C-1 and closes relay contacts C-2 to energize relay coil D. The energization of relay coil C also opens relay contacts C-3 and C-4 to stop motor 30.

The starting of the timer G closes contacts G-1 to energize relay H for two seconds with consequent closing of relay contacts H-1 for two seconds to keep the timer G energized for two seconds independently of the relay contacts A-3 and B-3. For two seconds relay contacts H-3 are closed but motor 80 is not energized for step-over because switch S-3 is in open position. The closing of relay contacts H-2 for two seconds does not energize tilt motor 92 because switch S-4 is open. The closing of relay contacts H-4 does, however, energize motor 70 for two seconds for horizontal step-over from the end of one welding traverse to the beginning of the next welding traverse because switch S-5 is in automatic mode.

If switch S-8 is at one of its two closed positions, relay coil J is energized for two seconds to cause energization of motor 70 for two seconds in one direction and if switch S-8 is in its second closed position relay coil K is energized for two seconds for rotation of motor 70 in the opposite direction. If relay coil J is energized, relay contacts J-1, J-2, J-3 and J-4 are closed to energize the motor 70 in one direction and relay contacts J-5 are opened to keep relay coil K de-energized. If relay coil K is energized contacts K-1, K-2, K-3, and K-4 close to energize the motor 70 in the opposite direction and relay contacts K-5 open to keep relay coil J de-energized.

At the end of the pause that is set on timer F, timer F closes relay contacts F-1 momentarily to energize relay coil E. The energization of relay coil E closes relay contacts E-2 to energize relay coil D with consequent closing of relay contacts D-1 to form a holding circuit to keep relay coil D energized after relay coil E is de-energized. The energization of relay coil D at the end of the pause closes relay contacts D-3 and D-4 to energize motor 30 in the opposite direction to begin the next succeeding welding traverse by the welding torch.

Since normally closed relay contacts A-4 and B-4 are in series with the wire feed motor 100, the feeding of the welding wire is interrupted whenever either of the two limit switches L-1 and L-2 is closed. Thus, the welding wire is fed to the welding torch only when the welding torch is making a welding traverse.

It is apparent that switch S-3 instead of switch S-5 may be placed in automatic mode for vertical step-over in the application of weld metal in zone IV. It is also apparent that switch S-4 may be the step-over switch that is placed in automatic mode to energize motor 92 for tilting the welding torch by increments for step-over in the course of depositing weld metal in zone III.

As heretofore stated in the operation of the apparatus for depositing weld metal in zone II, limit switch L-3 is substituted for limit switch L-2.

My description in specific detail of the selected embodiments of the invention will suggest various changes, substitutions and other departures from my disclosure within the spirit and scope of the appended claims.

I claim:

1. In an apparatus employing a welding device to deposit a series of contiguous weld beads on the interior wall of a hollow workpiece having coaxial upper and lower openings with the pattern of the series of the welding beads of a desired eccentricity relative to the axis of said openings, the combination:

a base structure intersecting said axis in the region of said openings;

a horizontal guideway mounted on the base structure radially of said axis for rotation about the axis;

a carriage movable along said guideway;

a support for said welding device mounted on said carriage;

first power means on said base structure to turn the guideway about said axis;

second power means on the [base structure] *carriage* to extend and retract said support for the welding device relative to the carriage to or from the interior wall of the hollow workpiece;

third power means to raise and lower said support for the welding device relative to the carriage;

fourth power means to swing said welding device up and down in an arc relative to the support; and means responsive to rotation of the guideway relative to the base structure to shift the carriage along the guideway in accord with the desired eccentricity of the pattern of the series of beads.

2. A combination as set forth in claim 1 which includes a control system to govern said power means respectively, said control system including a control panel mounted on said guideway.

3. A combination as set forth in claim 2 in which said control system includes a second control panel outside of the workpiece.

4. A combination as set forth in claim 2 in which said control system includes a relatively small portable remote control unit for temporary use for inching one of said power means in the course of setting up the apparatus to operate on the workpiece.

5. In an apparatus employing a welding device to deposit a series of contiguous weld beads on the interior wall of a hollow workpiece having coaxial upper and lower openings with the pattern of the series of the welding beads of a desired eccentricity relative to the axis of said openings, the combination of:

a base structure intersecting said axis in the region of said openings;

a linear guideway mounted on the base structure for rotation about said axis;

a carriage movable linearly along said guideway;

a support for said welding device mounted on said carriage;

a first power means on said base structure to turn the guideway about said axis;

a second power means on the [base structure] *carriage* to extend and retract said support for the welding device relative to the carriage to or from the interior wall of the hollow wall of the workpiece;

third power means to raise and lower said support for the welding device relative to the carriage;

fourth power means to swing said welding device up and down in an arc relative to the support; and means mechanically responsive to rotation of the guideway relative to the base structure about said axis to shift the carriage along the guideway in accord with the desired eccentricity of the pattern of the series of beads.

6. A combination as set forth in claim 5 in which said responsive means comprises:

a fixed member having a circular peripheral surface concentric to said axis; and flexible means in wrapping engagement with said peripheral surface, said flexible means having two opposite portions extending tangentially from the peripheral surface and connected to said carriage.

7. A combination as set forth in claim 5 in which said responsive means comprises:

a fixed sprocket concentric to said axis; and a sprocket chain attached to the carriage and in engagement with one side of the fixed sprocket.

8. A combination as set forth in claim 7 which includes means to maintain the sprocket chain under tension.

9. A combination as set forth in claim 8 in which said tension means is yieldable to permit the sprocket chain to be shifted from one side to the other of the fixed sprocket.

10. A combination as set forth in claim 7 in which said sprocket is removable to permit a sprocket of one diameter to be substituted for a sprocket of a different diameter to change the eccentricity of the pattern of the series of beads.

11. A combination as set forth in claim 7 in which the sprocket chain is engageable with opposite sides of the fixed sprocket selectively to cause the welding device to follow oppositely curved eccentric patterns.

12. A combination as set forth in claim 5 in which said responsive means comprises: a fixed eccentric cam and a cooperative follower to follow the cam, the follower being attached to the carriage.

13. A combination as set forth in claim 12 which includes spring means acting between the carriage and the guideway to urge said follower against the cam.

14. In an apparatus employing a welding device to deposit a series of contiguous weld beads on the interior wall of a hollow workpiece having coaxial upper and lower openings with the pattern of the series of the welding beads of a desired eccentricity relative to the axis of said openings, the combination of:

a base structure intersecting said axis in the region of said openings;

a linear guideway mounted on the base structure for rotation about said axis;

a carriage movable linearly along said guideway;

a support for said welding device mounted on said carriage;

a first power means on said base structure to turn the guideway about said axis;

a second power means on the [base structure] *carriage* to extend and retract said support for the welding device relative to the carriage to or from the interior wall of the hollow wall of the workpiece;

third power means to raise and lower said support for the welding device relative to the carriage;

fourth power means to swing said welding device up and down in an arc relative to the support; and means to shift the carriage along the linear guideway in accord with the desired eccentricity of the pattern of the series of beads.

15. A combination as set forth in claim 14 in which said base structure rests on the support surface on which the workpiece rests.

16. A combination as set forth in claim 15 in which the base structure is disconnected from the workpiece.

17. A combination as set forth in claim 15 in which the base structure has a plurality of legs and the legs are adjustable with respect to the spread of the legs.

18. A combination as set forth in claim 14 which includes a pair of limit switches responsive to travel of the carriage along the guideway to de-energize said first power means at the opposite ends of the beads of weld metal.

19. A combination as set forth in claim 14 which includes a sleeve on the carriage with said support for the welding device slidable longitudinally in the sleeve, said second power means acting between the sleeve and the support for the welding device to extend and retract the support for the welding device relative to the carriage.

20. A combination as set forth in claim 19 in which said carriage forms a vertical guideway for said sleeve and said third power means acts between the carriage and the sleeve to raise and lower the sleeve thereby to raise and lower the welding device.

21. A combination as set forth in claim 14 in which an arm extends from the carriage;

in which the welding device is pivotally mounted on the outer end of the arm;

and in which the fourth power means is mounted on the arm to control the angle of the welding device relative to the arm.

22. A combination as set forth in claim 14 which includes a control system for causing the welding device to traverse the interior of the workpiece automatically with automatic step-over at the end of each traverse, said control system including:

means to de-energize the first power means for a predetermined time period at the desired termination point of each bead;

means to energize one of said second, third, and fourth power means during said time period to shift the welding device to the desired starting point of the next successive bead;

means to interrupt the welding operation by said welding device for substantially the duration of said time period;

means to energize and reverse said first power means at the end of the time period; and means to resume the welding operation of said welding device at the end of the time period.

23. A combination as set forth in claim 22 which includes a manually operable selector switch for each of said four power means and a manually operable inching switch for each of the four power means, each of the selector switches having a position for automatic control of the corresponding power means to automatically carry out an operating cycle and an alternate position to permit manual control of the corresponding power means by the corresponding inching switch.

24. A combination as set forth in claim 22 in which the control system includes:

limit switches responsive to travel of the carriage on the guide means to de-energize the first power means at the desired termination points of the beads; and means effective at the beginning of each of said time periods to energize one of said second, third, and fourth power means for a time interval that is less than said time period to shift the welding device to the desired starting point of the next successive bead during the time period.

25. A combination as set forth in claim 24 which includes means responsive to the two limit switches to interrupt the welding operation by the welding device when either of the two limit switches is operated by the carriage and to resume the welding operation when neither of the two limit switches is operated.

26. A combination as set forth in claim 24, which includes a timer responsive to the two limit switches to operate for a given time period whenever either of the two limit switches is operated; and which includes means responsive to said timer to reverse and energize the first power means at the end of said time period.

27. A combination as set forth in claim 26, which includes a second timer responsive to the two limit switches to operate for a given time interval less than said time period whenever either of the two limit switches is operated; and which includes means to energize one of said circuits of said second, third, and fourth means for the duration of said time interval.

28. A combination as set forth in claim 26 which includes a spring-loaded switch for momentary manual operation to determine the initial direction of rotation of the first power means at the start of the deposition of a series of the weld beads.

29. A combination as set forth in claim 24 in which said series of eccentric beads terminates at the rim of one of said upper and lower openings of the hollow workpiece; and in which one of said limit switches is operative at the position of the carriage corresponding to the radius of the opening.

30. A combination as set forth in claim 29 in which said one limit switch is mounted on one of said carriage and said guideway;

in which an actuator for the limit switch is mounted on the other of said carriage and said guideway to operate said one limit switch; and in which one of said limit switch and said actuator is yieldable to yield to additional travel of the carriage to permit the first power means to be briefly energized for additional travel of the carriage when said one limit switch is operated, the additional travel shifting the welding device to the beginning point for the next successive eccentric bead.

31. In an apparatus for rebuilding a workpiece by a welding torch wherein the torch makes successive traverses of an area of the workpiece with automatic step-over and automatic reversal of the direction of travel of the torch at the end of each traverse, the improvement comprising:

means to cause the torch to pause in its travel for a predetermined time period at the end of each traverse; and means to cut off the supply of heat to the torch during the pause;

said pause serving to permit the molten metal to cool at the end of each bead before the next succeeding bead is started and in the welding of a relatively narrow area of the workpiece preventing overheating of the narrow area.

32. In an apparatus employing a welding device to deposit a series of contiguous weld beads on the interior wall of a hollow workpiece having coaxial upper and lower openings with the pattern of the series of the welding beads of a desired eccentricity relative to the axis of said openings, wherein the workpiece rests on a support surface with its two coaxial openings spaced apart vertically, the combination of:

a support structure resting on an area of said support surface that is defined by the lower of the two coaxial openings of the workpiece, said support structure extending upwardly into the interior of the workpiece;

a linear guideway rotatably mounted on the base structure and positioned for rotation about the axis of said openings;

*a carriage movable along said guideway;* a support for said welding device mounted on said carriage;

first power means on said base structure to rotate the guideway about said axis;

second power means on the [base structure] *carriage* to extend and retract said support for the welding device relative to the carriage to or from the interior wall of the hollow workpiece;

third power means to raise and lower said support for the welding device relative to the carriage;

fourth power means to swing said welding device up and down in an arc relative to the support; and means to shift the carriage along the guideway in accord with the desired eccentricity of the pattern of the series of beads.

33. A combination as set forth in claim [31] *32* in which the means to shift the carriage along the guideway in accord with the desired eccentricity of the pattern of the series of beads is mechanically responsive to rotation of the guideway about said axis; and in which said responsive means is reversible with respect to the direction of rotation of the guideway means that shifts the carriage outwardly of said axis, whereby the apparatus may be set up initially and operated to apply welding beads to the lower portion of the interior wall of the hollow workpiece, then the support structure and parts thereon may be removed from the interior of the workpiece, then the hollow workpiece may be turned upside down on said support surface and then with said responsive means reversed the support structure may be set up on the area of said support surface defined by the lowermost of the two openings of the hollow workpiece to apply welding beads to the remainder of the interior wall of the workpiece.

34. A combination as set forth in claim 33 in which said responsive means comprises:

a sprocket fixedly mounted on said support structure eccentrically of the axis of rotation of said guideway; and a sprocket chain attached to the carriage, said sprocket chain being engageable selectively with opposite sides of the fixed sprocket.

35. A combination as set forth in claim 33 in which said responsive means comprises:

an eccentric cam fixedly mounted on the base structure and a cooperative follower that is operatively connected to the carriage.

36. A method of depositing a series of contiguous welding beads on the interior wall of an eccentric pump shell having coaxially side openings on its two opposite sides respectively, characterized by the use of the combination of:

a support structure;

a linear guideway mounted on the support structure for rotation about an upright axis of rotation;

a carriage movable along said guideway;

a support for said welding device mounted on said carriage;

four power means operative respectively to turn the guideway about said axis of rotation, to extend and retract said support for the welding device relative to the carriage to or from the interior wall of the hollow workpiece, to raise and lower said support for the welding device relative to the carriage, and to swing said welding device up and down in an arc relative to the support; and means to shift the carriage along the guideway in accord with the desired eccentricity of the pattern of the series of beads, said method including the steps of:

placing said shell on its side on a support surface with said side openings spaced apart vertically;

placing said support structure on the area of said support surface that is defined by the lower side opening of the pump shell with said axis of rotation of the guideway coinciding with the axis that is common to the two side openings of the shell;

adjusting said guideway, said carriage, said support and said welding device, and energizing said power means as required to deposit welding beads on a lower portion of the interior wall of the pump shell;

removing the support structure from the interior of the pump shell;

turning the pump shell upside down on said support surface to reverse the positions of the two side openings of the pump shell;

mounting said support structure on the area of the support surface that is defined by the lower side opening of the reversed pump shell with said axis of rotation of the guideway coinciding with the axis of the two side openings of the pump shell; and adjusting said guideway, said carriage, said support, and said welding device, and energizing said power means as required to deposit welding beads on the remainder of the interior wall of the pump shell.

37. A method as set forth in claim 36 in which the means to shift the carriage along the guideway is mechanically responsive to rotation of the guideway about said axis of rotation and is reversible with respect to which direction of rotation of the guideway causes shift of the carriage outwardly of said axis of rotation; and which includes the step of reversing said responsive means in preparation for depositing welding beads after the pump shell is turned upside down.

38. A method as set forth in claim 37 in which said responsive means comprises a fixed sprocket on said base structure concentric to said axis of rotation and a sprocket chain attached to the carriage, the sprocket chain being selectively engageable with opposite sides of the fixed sprocket; and in which the step of reversing the responsive means comprises shifting the sprocket chain from engagement with one side of the fixed sprocket to engagement with the opposite side of the fixed sprocket.

* * * * *